United States Patent [19]
Crane et al.

[11] Patent Number: 5,833,782
[45] Date of Patent: Nov. 10, 1998

[54] HIGH-ENERGY-ABSORBING ENCLOSURE FOR INTERNAL EXPLOSION CONTAINMENT

[75] Inventors: Roger M. Crane, Arnold; Paul A. Coffin, Rosehaven, both of Md.

[73] Assignee: The United States of America as Represented by the Secretary of the Navy, Washington, D.C.

[21] Appl. No.: 903,787

[22] Filed: Jul. 31, 1997

Related U.S. Application Data

[62] Division of Ser. No. 491,047, Jun. 15, 1995, Pat. No. 5,654,053.

[51] Int. Cl.$^6$ ................................................. F42B 39/24
[52] U.S. Cl. .................... 156/60; 428/36.5; 428/36.9; 206/3; 2/2.5; 102/331
[58] Field of Search .................... 428/36.5, 36.9, 428/36.91, 308.4, 318.4, 911; 206/3; 156/443, 60; 2/2.5; 102/331

[56] References Cited

U.S. PATENT DOCUMENTS

| | | | |
|---|---|---|---|
| 3,899,623 | 8/1975 | Okazaki et al. | 428/290 |
| 4,233,359 | 11/1980 | Mimura et al. | 428/254 |
| 4,954,377 | 9/1990 | Fischer et al. | 428/36.1 |
| 5,108,262 | 4/1992 | Crane | 416/230 |
| 5,133,258 | 7/1992 | Rock et al. | 102/331 |
| 5,157,223 | 10/1992 | Wheeler et al. | 102/374 |
| 5,267,665 | 12/1993 | Sanai et al. | 220/88.1 |
| 5,308,675 | 5/1994 | Crane et al. | 428/120 |
| 5,447,765 | 9/1995 | Crane | 428/36.9 |
| 5,503,879 | 4/1996 | Cochran | 427/389.9 |
| 5,573,344 | 11/1996 | Crane et al. | 403/179 |
| 5,654,053 | 8/1997 | Crane et al. | 428/36.5 |

*Primary Examiner*—Daniel Zirker
*Attorney, Agent, or Firm*—Howard Kaiser

[57] ABSTRACT

A structural enclosure, box-like for many embodiments, which effectively contains an explosion, thereupon remaining virtually intact and minimizing fragmentation. The structural wall has a sandwich-like arrangement of two fiber-reinforced matrix material skins and a foam core situated between the two skins, at least one skin having fiber-reinforced high strain-to-failure viscoelastic matrix material. The core foam material selectively varies in density so as to provide appropriate rigidity or flexibility at different locations of the structural enclosure. The fiber-reinforced high strain-to-failure viscoelastic matrix material can be deformed elastically to large strains, has demonstrably high energy-absorbing characteristics, and is relatively lightweight. Upon explosive impact, the inner skin largely deforms so as to be energy-absorbent of the pressure wave caused by the explosive charge, the foam core crushes so as to also be energy-absorbent, the outer skin largely deforms, and both skins contain debris.

9 Claims, 3 Drawing Sheets

HIGH-ENERGY-ABSORBING ENCLOSURE FOR INTERNAL EXPLOSION CONTAINMENT

This application is a division of application Ser. No. 08/491,047, filed Jun. 15, 1995, now U.S. Pat. No. 5,654,053, issued on Aug. 5, 1997.

The invention described herein may be manufactured and used by or for the Government of the United States of America for governmental purposes without the payment of any royalties thereon or therefor.

This application is related to copending patent application Ser. No. 08/237,579, filed 03 May 1994, now U.S. Pat. No. 5,744,221, incorporated herein by reference, and copending patent application Ser. No. 08/237,533, filed 3 May 1994, now U.S. Pat. No. 5,447,765, incorporated herein by reference.

BACKGROUND OF THE INVENTION

The present invention relates to methods and apparatuses for explosion containment, more particularly with regard to structures which are intended to enclose an explosive device and to some degree contain the explosive effects resulting from detonation of the explosive device.

Explosives kill, maim and destroy. Much to the dismay of civilized society, there exists the ongoing need to protect people and property from terroristic acts which implement explosive devices. Terrorist bombs represent a constant threat in public areas, especially on commercial aircraft. In addition, in military conflicts the need arises to protect against damage and injury caused by one's own armaments due to hostile fire.

Structural applications in general have seen increased usage of composite materials. Of more specific relevance is that composite materials have been considered for various applications requiring ballistic structural protection. For the Composite Armor Vehicle, currently being designed and fabricated by the U.S. Army Tank Command, the composite structure is a sandwich core configuration having a thick structural composite inner layer of S-2 glass fabric infiltrated with a organic matrix material, a core of ceramic tiles, and an outer thin facesheet of composite. According to the conventional system for ballistic structural protection, the composite portion of the structure provides the structural integrity and some of the energy absorption; however, the ceramic tiles, by means of their crushing, constitute the predominant absorber of energy. Among the drawbacks of this conventional system, the structure is typically very heavy. Moreover, upon explosive impact the structure creates and may be penetrated by its own shrapnel.

SUMMARY OF THE INVENTION

In view of the foregoing, it is an object of the present invention to provide a structural enclosure which effectively contains an explosion originating within said structural enclosure.

It is a further object of this invention is to provide such a structural enclosure which remains virtually intact upon such an explosion, especially so as to minimize fragmentation and scattering of its own material upon such an explosion.

Another object of this invention to provide such a structural enclosure which is more lightweight than a conventional structural enclosure used for a similar purpose.

The present invention provides a composite walling structure which comprises two skins and a core between the two skins. The two skins each include fiber-reinforced matrix material. At least some of the fiber-reinforced matrix material in at least one skin is fiber-reinforced high strain-to-failure viscoelastic matrix material. The core includes foam material which, for many embodiments, selectively varies in density in at least two locations. The composite structure according to this invention, through the thickness of the structural wall, has a "sandwich-like"arrangement of a core situated between two skins.

The composite structure in accordance with the present invention is "walling" in the structural sense that the structure is, configurationally, circumscriptive or surrounding; i.e., it is structurally shaped so as permit entire or substantial enclosure of an object within the structure. In application the walling structure is functionally shaped so as to permit significant containment of an explosive blast which originates from the object which the structure entirely or substantially encloses.

For many embodidments of the present invention the walling configuration of the composite structure is preferably rectilinear and box-like. Such an embodiment may feature greater configurational simplicity which lends itself to efficient fabrication methodology such as described in an example hereinbelow; yet, for many applications such an embodiment may be as effective for purposes of explosion containment as an embodiment according to this invention which has greater configurational intricacy.

A class of composite materials which the U.S. Navy has recently developed is fiber-reinforced polyurethane. Polyurethane is a highly viscoelastic matrix material, having strain-to-failure of 400–500%, compared to a conventional polymer used in composites which has a strain-to-failure on the order of 5–10%. In some cases, the U.S. Navy has utilized polyurethane in combination with urea as a highly viscoelastic matrix material having properties similar to polyurethane alone. For convenience the terms "urethane" and "polyurethane" as used herein each refer to either polyurethane or polyurethane/urea.

Accordingly, composite material made with polyurethane matrix material is afforded deformation characteristics which significantly differ from those of other, conventional composite materials. Fiber-reinforced polyurethane material can be deformed elastically to large strains when the load is normal to the plane of the material. The deformation of fiber-reinforced polyurethane which occurs is one of global deformation of the fibers along with high shear deformation of the interface between the layers of reinforcement. This large deformation results in large dissipation of energy.

The present invention features utilization of highly ("high strain-to-failure") viscoelastic matrix material (such as polyurethane or polyurethane/urea), in conjunction with conventional fibrous material, for making portions of a structure which may be used for explosion containment. Fiber-reinforced highly viscoelastic matrix material has demonstrably high energy-absorbing characteristics and is relatively lightweight. In accordance with the present invention, this material form is appropriately and advantageously implemented for applications wherein a structure is subjected to high rate loading and wherein high energy absorption is required in order to contain an explosive blast.

The present invention further features appropriate and advantageous implementation of foam material (such as polystyrene plastic) in cooperative adjacent relationship with the fiber-reinforced highly viscoelastic matrix material. In accordance with many embodiments of this invention, a pair of fiber-reinforced highly viscoelastic matrix material layers is situated outside, parallel to and contiguous with an intermediate foam core layer so as to form a tri-stratified planar structural configuration which is capable of elastically deforming to very large strains, without significant damage, as a result of proximately originating explosive force. According to many preferred embodiments of the present invention, the structural enclosure which may be used for entirely or substantially surrounding an explosive source is configurationally box-like; for some such embodiments, a sealable door opens to permit placement of objects within and removal of objects from the structural enclosure.

In tests conducted by the U.S. Navy, material of high fiber-volume-fraction glass fabric with urethane matrix demonstrated very large elastic strains, which should translate into large recoverable energy absorbing material. A sandwich core configuration in accordance with this invention, having two structural skins of fiberglass-reinforced urethane and an intermediate foam core of selectively varied density, should yield a structure which would be capable of effectuating the following upon explosive impact: (i) large deformation of the inner skin, this deformation absorbent of the pressure wave caused by the explosive charge; (ii) crushing of the foam core, this crushing also an energy-absorbing mechanism; (iii) large deformation of the outer skin; and, (iv) containment of debris by the skins.

This stratified "sandwich-like" arrangement would also serve to minimize ballistic fragment penetration as well as formation and scattering of fragments originating from the protective structure itself. In application, the extent of shrapnel-type effect resulting from an explosion, such as would pierce an aircraft fuselage or sympathetically detonate other munitions, should be significantly reduced. For many embodiments of this invention the inner and outer fiber-reinforced highly viscoelastic matrix material skins comprise a plurality of fabric plys; for such embodiments this lamination feature of the skins may serve to further containment thereby of explosive fragmentation.

The term "fiber-reinforced matrix material," as used herein, refers to composite material which includes fibers and matrix material which are, to a substantial degree, in a contiguous relationship.

The term "fiber-reinforced conventional matrix material" refers herein to composite material which includes fibers and conventional matrix material (such as epoxy) which are, to a substantial degree, in a contiguous relationship; i.e., fiber-reinforced conventional matrix material is fiber-reinforced matrix material wherein the matrix material is conventional matrix material.

The term "fiber-reinforced highly viscoelastic matrix material" is synonymous herein with the term "fiber-reinforced high-strain-to-failure viscoelastic matrix material" and refers herein to composite material which includes fibers and highly (high strain-to-failure) viscoelastic matrix material which are, to a substantial degree, in a contiguous relationship; i.e., fiber-reinforced highly (high-strain-to-failure) viscoelastic matrix material is fiber-reinforced matrix material wherein the matrix material is highly (high strain-to-failure) viscoelastic matrix material.

The term "fiber-reinforced homogeneous matrix material" refers herein to composite material which is, disjunctively, either fiber-reinforced conventional matrix material or fiber-reinforced highly (high-strain-to-failure) viscoelastic matrix material.

The term "fiber-reinforced heterogeneous matrix material" refers herein to composite material which includes both fiber-reinforced conventional matrix material and fiber-reinforced highly (high-strain-to-failure) viscoelastic matrix material; i.e., fiber-reinforced heterogeneous matrix material is composite material of which at least one portion is fiber-reinforced conventional matrix material and at at least one portion is fiber-reinforced highly (high-strain-to-failure) viscoelastic matrix material.

Accordingly, the term "fiber-reinforced matrix material" refers to composite material which is, disjunctively, either fiber-reinforced homogeneous matrix material or fiber-reinforced heterogeneous matrix material.

The term "foam material" as used herein refers to any two-phase gas-solid material system in which the solid has continuity. Foam material is "spongelike" in that it has a cellular structure. The cells of a foam material can be closed, interconnected or a combination thereof. Foam materials vary in terms of greater rigidity versus greater flexibility.

For most embodiments and applications of the present invention, the solid of the foam material is preferably a synthetic polymer or rubber. There are many conventionally known foam materials in this category, such materials being variously and generally interchangeably described as "plastic foams," "foamed plastics," "cellular polymers" and "expanded plastics." Varieties of other kinds and categories of foam materials, e.g., glass foams, ceramic foams and metal foams, are also conventionally known, and may be appropriately or preferably used for a given embodiment or application in practicing this invention.

Basic utilization of a composite sandwich configuration having a core which separates two facings is known in the art. Various foam materials are known to be appropriate for use as the core in sandwich constructions; generally, more rigid foams are considered preferable as the core material for such configurations.

The ordinarily skilled artisan is acquainted with composite sandwich construction, as well as with the various types of foam material and their characteristics, and is capable of selecting a foam material which may be appropriately or preferably used as the foam core material in practicing any of the multifarious embodiments and applications of the present invention. See, e.g., Grayson, Martin, Encyclopedia of Composite Materials and Components, John Wiley & Sons, New York, 1983, "Foamed Plastics," pages 530–574; Lubin, George, Handbook of Composites, supra, chapter 21 ("Sandwich Construction," pages 557–601), glossary (e.g., "foamed plastics," page 763); Brady, George S., Clauser, Henry R., Materials Handbook, McGraw-Hill, Inc., New York, 1991, pages 341–351 I("foam materials"), pages 718–719 ("sandwich materials"); Lee, Stuart M., Dictionary of Composite Materials Technology, Technomic Publishing Co., Inc., Lancaster, Pa., 1989, e.g., page 61 ("foams").

In tests performed by the U.S. Navy, large elastic deformations were shown to exist in fiber-reinforced polyurethane plate configurations having thicknesses up to 0.75 inches. Deformation without permanent damage to the fiber-reinforced polyurethane material was demonstrated for a 0.75 inch thick fiber-reinforced polyurethane plate over a 4 inch (16 square inch) unsupported area at a distance of 1 inch normal to the plane of the plate. Large elastic deformation was also shown to exist in a fiber-reinforced polyurethane hollow cylindrical configuration in testing by the U.S. Navy wherein loads were applied in the plane of the fiber-reinforced polyurethane material. A tube with an inner diameter of 2 inches and a wall thickness of 0.25 inches was compressed from an original length of 6 inches to a length of 4 inches. Upon the releasing of the load, the tube recovered fully and undamaged to its original length.

By virtue of the large elastic deformations which result in large energy absorption, the composite structures according to the present invention afford significant improvement over conventional structures in terms of damage tolerance and shock tolerance. Moreover, the composite structures according to this invention (for example, those structures including urethane matrix material) are lightweight and corrosion-resistant and are fabricated using commercially available material constituents and manufacturing techniques which are typically used for fabricating composites.

In accordance with this invention, conventional resin transfer molding techniques are utilized for fabricating structures wherein the fiber reinforcement material is fabric material. Resin transfer molding is a process known in the art whereby liquid resin is infused into a dry fiber preform while in a closed mold. The resin cures while in the mold, permanently trapping the fibers in desired register. As advancements have been made in instrumentation, reinforcement fibers and resins, resin transfer molding has been increasingly considered for various structural applications.

To greater appreciate the enhanced capability of the structural systems according to this invention, the energy absorbed by a material may be visualized as related to the area under a stress-versus-strain curve. Conventional composites have a maximum strain-to-failure of about 10%. Urethane matrix material has a strain-to-failure of up to 450%. The resultant area under the curve for the urethane matrix material is therefore significantly greater than that for the conventional composite material.

In ballistic testing by the U.S. Navy on urethane matrix material, no shrapnel was created from the urethane matrix material as a result of impact on the urethane matrix material by 50 caliber fragments. In addition, the urethane matrix material contained these 50 caliber fragments at velocities up to 2,100 feet per second. Moreover, impact from a specific 50 caliber fragment resulted in an area of damage to the urethane matrix material which was equal to approximately four times the diameter of the 50 caliber fragment. It should be emphasized, however, that this damage was in the form of minor delaminations; even when the urethane matrix material was penetrated, there was no resulting hole. Accordingly, the urethane matrix material proved to be virtually self-sealing.

In conventional composites, on the other hand, the damage area which is caused by ballistic impact is normally orders of magnitude greater than the size of the impacter. Furthermore, there are normally large portions of conventional composite material which are blown out from the impacting fragment. This damage to the conventional composite material results in significant reduction in the structural characteristics of the conventional composite material. Hence, a structure made of conventional composite material may be expected to be severely compromised by an initial ballistic impact; further ballistic impacting would not be contained by the structure and would perhaps totally destroy the structure.

The present invention has relation to the patents and co-pending patent applications mentioned hereinbelow, for each of which Roger M. Crane is sole or joint inventor.

U.S. Pat. No. 4,954,377 to Fischer and Crane, incorporated herein by reference, and U.S. Pat. No. 5,108,262 to Crane, incorporated herein by reference, disclose utilization of highly viscoelastic matrix materials in conjunction with multidimensionally braided fiber preforms; these two patents demonstrate the ability, via resin transfer molding, to readily infiltrate fiber preforms which are multidimensionally braided fiber preforms with liquid resin which is high strain-to-failure viscoelastic material.

Crane, Santiago and Jones at aforementioned U.S. application Ser. No. 08/237,579, filed 03 May 1994, now U.S. Pat. No. 5,744,221, incorporated herein by reference, and Crane at aforementioned U.S. application Ser. No. 08/237,533, filed 03 May 1994, now U.S. Pat. No. 5,447,765, incorporated herein by reference, disclose utilization of highly viscoelastic matrix materials, in conjunction with fabric material or unidirectionally aligned fibers, for making structures which can elastically deform to very large strains.

Crane, Santiago and Jones at U.S. application Ser. No. 08,237,579, now U.S. Pat. No. 5,744,221, disclose composite structures which may be cost-effectively fabricated using conventional resin transfer molding or conventional filament winding technique, and which afford desired structural performance as well as superior performance in terms of flexibility, damping and damage-tolerance. Featured by Crane, Santiago and Jones at U.S. application Ser. No. 08,237,579, now U.S. Pat. No. 5,744,221, is utilization of conventional fabric material or single-stranded tow material, in lieu of the multidimensionally braided fiber material taught by Fisher and Crane at U.S. Pat. No. 4,954,377 and Crane at U.S. Pat. No. 5,108,262, as the fiber reinforcement material which combines with the high strains-to-failure viscoelastic material.

Crane at U.S. application Ser. No. 08/237,533, now U.S. Pat. No. 5,447,765, discloses a multiple-layered, translatedly rib-stiffened, composite hollow cylinder and a method for fabrication thereof which utilizes filament winding technique known in the art. According to Crane at U.S. application Ser. No. 08/237,533, now U.S. Pat. No. 5,447,765, selective utilization of high strain-to-failure viscoelastic matrix material, without resort to secondary processing, results in improved damping characteristics in terms of dissipation of mechanical and acoustic energy as well as improved structural characterics in terms of damage tolerance.

Crane, Santiago and Jones at U.S. application Ser. No. 08,237,579, now U.S. Pat. No. 5,744,221, and Crane at U.S. application Ser. No. 08/237,533, now U.S. Pat. No. 5,447,765 disclose utilization of a high strain-to-failure viscoelastic matrix material (such as polyurethane), instead of a conventional matrix material (such as epoxy), as some or all of the matrix material which combines with conventional fabric fiber reinforcement material or conventional tow fiber reinforcement material, for purposes of making high-damping, damage-tolerant composite structures. By contrast, Fisher and Crane at U.S. Pat. No. 4,954,377 and Crane at U.S. Pat. No. 5,108,262 disclose utilization of high strain-to-failure viscoelastic matrix material instead of a conventional matrix material as matrix material which combines with multidimensionally braided fiber reinforcement material for purposes of making their respective structures.

Similar to what is included in the disclosure by Crane, Santiago and Jones at U.S. application Ser. No. 08,237,579, now U.S. Pat. No. 5,744,221, the present invention utilizes conventional resin transfer molding technique for infiltrating high strain-to-failure viscoelastic matrix material into conventional fabric fiber reinforcement material for making composite structures; however, the present invention utilizes fiber-reinforced high strain-to-failure viscoelastic matrix material in combination with foam core material to form new structural systems which respond quite differently in comparison with the structural systems disclosed by Crane, Santiago and Jones at U.S. application Ser. No. 08,237,579, now U.S. Pat. No. 5,744,221.

The term "fabric" as used herein is as conventionally understood, viz., any cloth-like material entity which is formed by weaving, knitting, knotting, felting and/or matting of fibers; in other words, the fibers of a fabric are integrally interrelated "in fabric form." The term "fabric material" as used herein is material comprising one or more fabrics.

In accordance with this invention, a fabric can have fibers of either uniform or diverse fiber types. The fibers of a fabric can be natural or synthetic or some combination thereof. Moreover, two or more fabrics of either uniform or diverse fabric types can comprise the fabric material which is utilized for practicing various embodiments of this invention. The fabric material which is utilized in accordance with the present invention may include one fiber type or a plurality of fiber types.

Practice of the present invention most often preferably utilizes fabric material of appropriate strength for structural applications, generally referred to by manufacturers as "reinforcing fabric material." Among the common categories of such material is fiberglass fabric reinforcement, which is readily available as fiberglass fabric, woven or matted in various forms. See, e.g., Lubin, George, *Handbook of Composites*, Van Nostrand Reinhold Company, New York, 1981, section I (entitled "Raw Materials"), chapter 8 (entitled "Fiberglass Reinforcement"); see, esp., subsection 8.5 (entitled "Fiberglass Forms"), pages 141–149.

Fabric material is distinguishable from the multidimensionally braided fiber material which is disclosed by Fisher and Crane at U.S. Pat. No. 4,954,377 and Crane at U.S. Pat. No. 5,108,262. The fibers of the multidimensionally braided fiber material traverse through the thickness of the preform and in multitudinous directions in three dimensions; the resultant preform is an integral system of a specific predetermined shape having thickness, width and length. Fabrics are planar, or virtually so, albeit that fibers therein may be found in different directions in two dimensions, i.e., within the fabric plane.

The ordinarily skilled artisan is well acquainted with the kinds and characteristics of fiber-reinforcing materials which are conventionally or appropriately used for various structural applications. For example, glass fibers, generally speaking, are more flexible and less expensive than carbon fibers. In accordance with the present invention, the fiber reinforcing material, in the form of fabric material, can be but is not limited to fiber-reinforcing material in any combination among any of the following categories thereof, well known to the ordinarily skilled artisan: glass fiber; carbon fiber (e.g., graphite fiber); polymer-based fiber (e.g., that which is sold under the trade names kevlar and spectra, kevlar being an aramid); quartz fiber; ceramic fiber (e.g., silicon carbide fiber); metallic fiber (e.g., aluminum fiber). Natural fibers such as silk or cotton or polymer-based fibers such as nylon or rayon are not conventionally used as fiber-reinforcing material for structural applications; nevertheless, any fiber-reinforcing material known to man can be used in accordance with the present invention, so long as that fiber-reinforcing material is appropriate for a given structural application.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein.

DETAILED DESCRIPTION OF THE INVENTION

Figure 1:
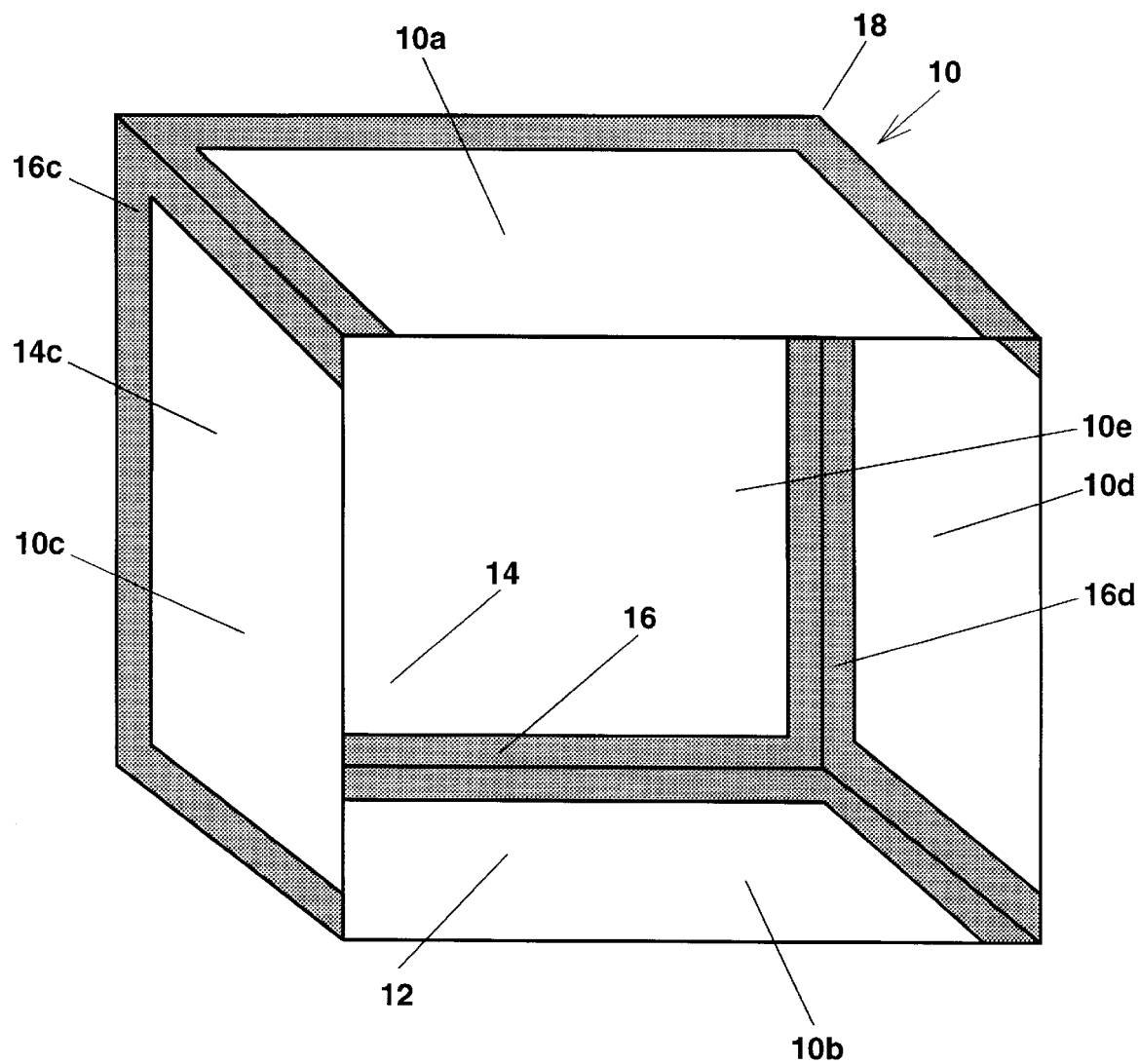
FIG. 1 is a diagrammatic perspective view illustrating an embodiment according to the present invention of fabrication of a rectangular-box-like structure for explosion containment.

Referring now to FIG. 1, fabrication of a blast-proof enclosure in accordance with the present invention commences with assembly of foam core material into foam box 10, shown with open side 12 facing the viewer. According to the view shown in FIG. 1, the five structural sides of foam box 10 are horizontal top side 10a, horizontal bottom side 10b, vertical left side 10c, vertical right side 10d and vertical back side 10e.

Foam box 10 has a face region 14 and an edge region 16. Edge region 16 includes the locations of planar edge interface between adjacent sides of foam box 10. Thus, each side of foam box 10 has a face subregion which is rectangular and an edge subregion which borders the face subregion on three or all four rectangular sides. For example, vertical left side 10c has face subregion 14c and edge subregion 16c. Each edge subregion for sides 10a, 10b, 10c and 10d includes vicinities for three junctions between two adjacent sides of foam box 10; the edge subregion for side 10e includes vicinities for four junctions between two adjacent sides of foam box 10.

The foam core material is assembled with higher density (relatively rigid) foam in face region 14 and lower density (relatively flexible) foam in edge region 16. This may be accomplished by appropriately attaching, using conventional adhesives, five four-sided (approximately rectangular and approximately planar in this example) face members which are located in face region 14 and eight approximately "L"-shaped (right-angled) linear edge members which are located in edge region 16. The linear edge members should be complementarily configured at their ends for flush engagement at corners 18 of foam box 10.

Next, all five sides of foam box 10 are externally covered with reinforcing fabric. This fabric-covering procedure may be accomplished by wrapping in three orientations. For the first orientation, each ply of fabric is cut and positioned so that it congruently and continuously covers three sides., viz., vertical left side 10c, vertical back side 10e and vertical right side 10d. For the second orientation, each ply of fabric is cut and positioned so that that it congruently and continuously covers three sides., viz., horizontal top side 10a, vertical back side 10e and horizontal bottom side 10b. For the third orientation, each ply of fabric is cut and positioned so that that it congruently and continuously covers four sides, viz., horizontal top side 10a, vertical right side 10d, horizontal bottom side 10b and vertical left side 10c. By wrapping thusly, all sides 10, including all face regions 12 and all edge regions 14, are completely covered by reinforcing fabric.

Wrapping of fabric in this superposing manner is repeated for all three orientations is until the desired fabric thickness is achieved for all five sides.

Then utilized is a smaller structural shape which is, configurationally, similar to and compatible with foam box 10. The structural shape includes a rigid material (such as steel or aluminum) and an elastomeric material which completely exteriorly coats the rigid material; the elastomeric material has a high coefficient of thermal expansion and a thickness of at least 0.5 inches. Foam box 10 having been previously wrapped with fabric, the structural shape is now externally wrapped with fabric in the manner described hereinabove for wrapping foam box 10. The structural shape is sized and the wrapping thereof effectuated such that the fully wrapped structural shape may appropriately fit within foam box 10.

At this point the larger assembly (i.e., the fully wrapped foam box 10) and the smaller assembly (i.e., the fully wrapped structural shape) are each subjected to a resin transfer molding process. Outer molds are placed over each assembly and RTM technique is separately used to infiltrate the urethane material into the fabric for each assembly. The fabric for the smaller assembly and the fabric for the larger assembly having thus been infiltrated, the outer mold for the smaller assembly is removed and the smaller assembly is then positioned within the larger assembly.

The smaller assembly and the larger assembly having thus formed a combined assembly, the combined assembly is heated in order to cure the urethane matrix. Since the elastomer coating of the structural shape for the smaller assembly has a high coefficient of thermal expansion, the heat also serves to cause the elastomer coating to push the infiltrated fabric material for the smaller assembly against the interior surface of foam box 10, thus ensuring an integral bond between this infiltrated fabric material and foam box 10.

Figure 2:
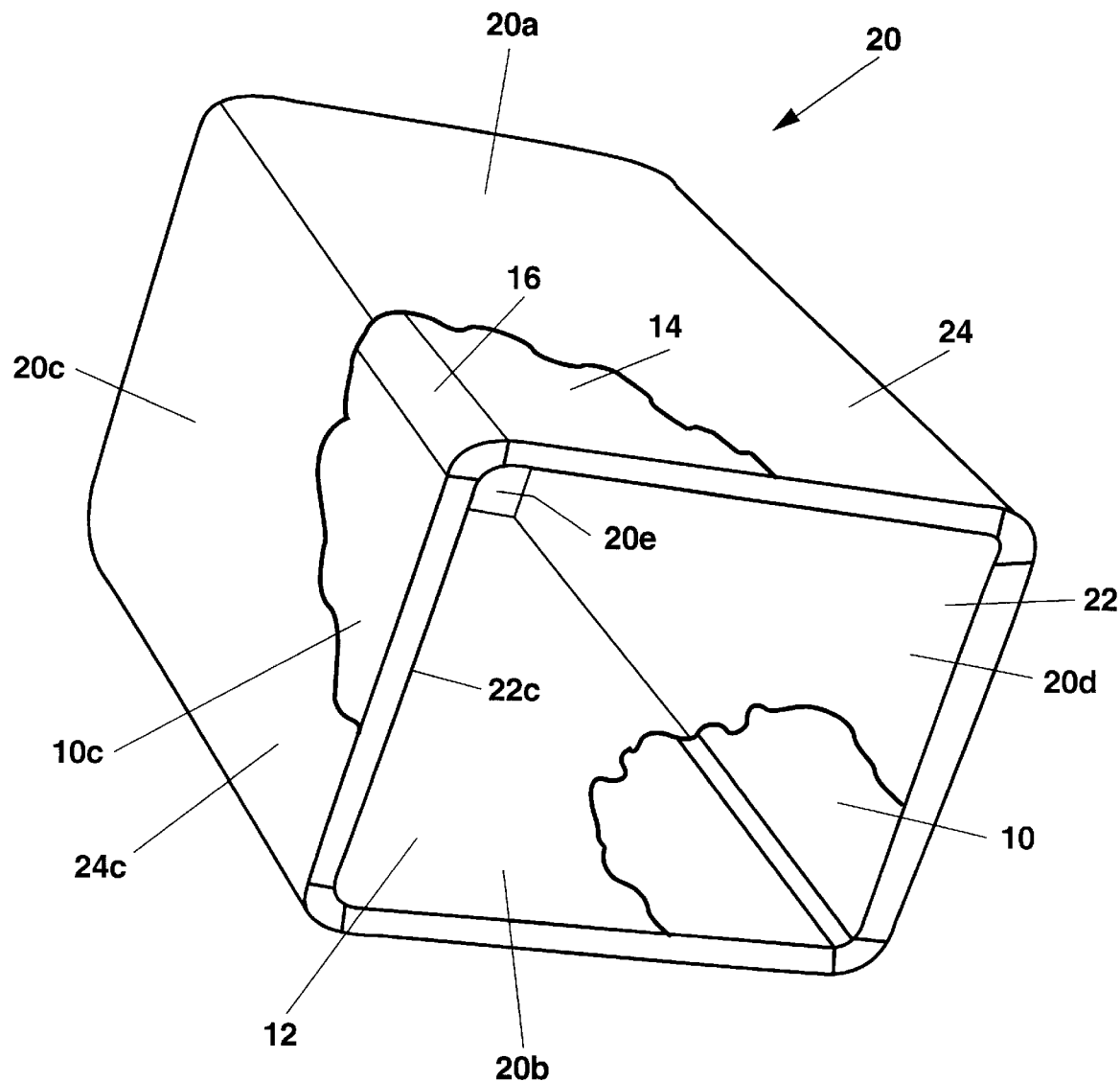
FIG. 2 is a view similar to that in FIG. 1, with skin portions removed to reveal the foam core, of an embodiment of a completed structure for explosion containment according to the present invention, such as a completed structure which has been fabricated according to the illustration in FIG. 1.

After curing, the outer mold for the larger assembly and the inner structural shape for the smaller assembly are both removed, leaving an embodiment such as shown in FIG. 2 of a completely fabricated "blast-proof" structure in accordance with the present invention. A completed structure according to this invention is configurationally circumscriptive, in this example rectangular-box-shaped, for purposes of containing an explosive blast which would originate from within the completed structure.

With reference to FIG. 2, completed and undeformed rectangular-box-like structure 20 having open side 12 is appropriately both damage-tolerant and flexible for purposes of ballistic containment. The five structural sides of completed structure 20 are horizontal top side 20a, horizontal bottom side 20b, vertical left side 20c, vertical right side 20d and vertical back side 20e. Structure 20 has inner layer 22, outer layer 24 and intermediate layer 10. Each structural side of completed structure 20 has an inner sublayer, an outer sublayer and an intermediate sublayer. For example, vertical left side 10c has inner sublayer 22c, outer sublayer 24c, and intermediate sublayer 10c. Inner layer 22 and outer layer 24 are each a laminate skin comprising fiber-reinforced urethane matrix material having a plurality of fabric plys. Intermediate layer 10 comprises foam box 10, which has higher density foam in face region 14 and lower density foam in edge region 16. The intermediate sublayer for each structural side comprises the corresponding structural side of foam box 10, each structural side having higher density foam in the face subregion and lower density foam in the edge subregion.

Structure 20 is "rectilinear," i.e., generally characterized by straight lines but not necessarily strictly so. Some curvilinearity of a rectilinear structure 20 may be preferred for many embodiments of this invention. For example, in FIG. 2 structure 20 is shown to have slight curvature at the junctional edges between sides of structure 20, a curvature which is in conformity with the curvature of the linear edge members which are located in edge region 16 of foam box 10.

Structure 20 in FIG. 2 has isotropic properties with regard to its structural sides when structure 20 is considered from the perspective of an interior spatial location within structure 20. For many embodiments of this invention structure 20 in this respect is substantially or virtually isotropic; i.e., its five structural sides (for some embodiments a sixth, replaceable side, as well) are identically or similarly constructed. For some embodiments such isotropism may advantageously serve to lend balance to the spread of explosive energy.

In practicing most embodiments of this invention, intermediate layer 10 may be expected to be considerably thicker than inner layer 22 or outer layer 24. The appropriate thickness ratio of the foam core vis-a-vis' either fiber-reinforced highly viscoelastic matrix material skin may depend upon the blast requirements for a particular application; in more typical practice of this invention the foam core may be expected to have five to ten times the thickness of either skin.

In operation, the structural system in accordance with the present invention effectuates explosion containment generally as follows. Upon the subjecting of the interior of structure 20 to an explosive detonation, a high rate pressure wave is produced, accompanied by extreme fragmentation of the enclosed exploding object; more moderate fragmentation of intermediate layer 10 of structure 20 ensues. When the pressure wave hits inner layer 22, inner layer 22 elastically deforms outward, thereby crushing intermediate layer 10, in particular crushing the rigid foam material in face region 14 of intermediate layer 10. In order to prevent fracturing of structure 20, flexible foam material in edge region 16 permits inner layer 22 to deflect or hinge outward without large stress concentrations. Deformation of inner layer 22 results in energy dissipation, and crushing of intermediate layer 10 results in additional energy absorption. As the rigid foam material in face region 14 of intermediate layer 10 crushes, outer layer 24 will elastically deform outward as a consequence of likewise being subjected to the loading from inner layer 22.

By way of elaboration, upon detonation of the explosive device, there is a rapid expansion of gas, along with the creation of shrapnel material from structure 20. The rapidly expanding gas, creating an over-pressure condition, will cause inner layer 22 to deform outward. This expansion, typically elastic in nature, occurs with the absorption of energy, the source of which is the explosion.

This expansion of inner layer 22 is sequentially followed by a crushing of intermediate layer 10 at face region 14, and crushing followed by flexing of intermediate layer 10 at edge region 16. This crushing of intermediate layer 10 along with the additional elongation or straining of inner layer 22 is also an energy-absorbing mechanism.

Next in sequence is the expansion or straining of outer layer 24. The motion of outer layer 24 occurs only after inner layer 22 and intermediate layer 10 have deformed a specified amount. The system now responds as a unit with the expansion of all three structural components until all of the energy created in the explosion is transferred into strain energy in the structural components.

Figure 3:
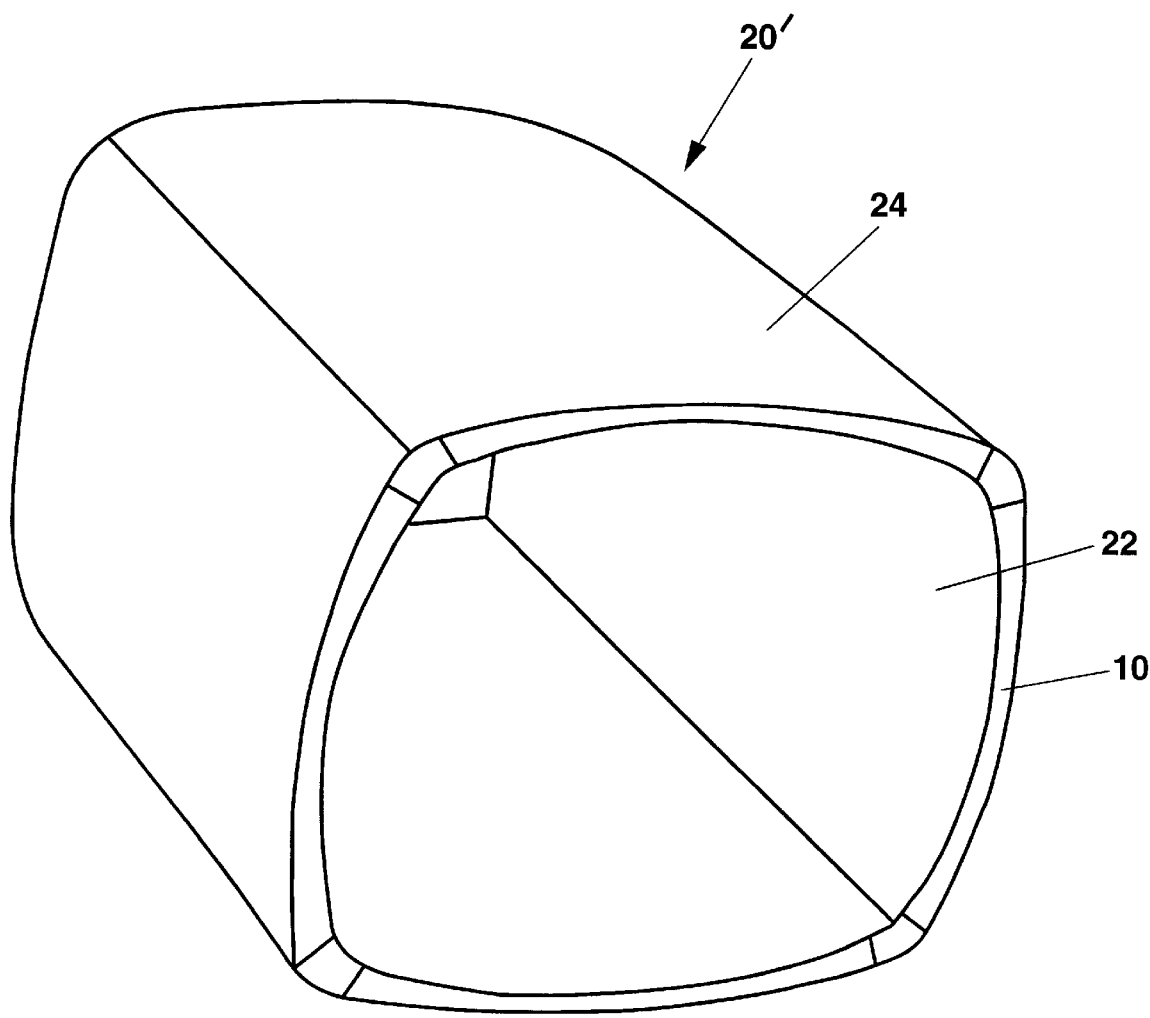
FIG. 3 is a view similar to that in FIG. 2 illustrating deformation by interior explosive detonation of the completed structure shown in FIG. 2.

With reference to FIG. 3, deformed structure 20' is structure 20 which has undergone deformation resulting from explosive detonation originating from the interior of structure 20. Shrapnel deriving from the exploding object and from intermediate layer 10 has been contained by inner layer 22 and outer layer 24, thus having prevented resultant regrettable happenstances of flying debris, such as penetration of an airplane fuselage, or precipitation of sympathetic detonation of nearby munitions, or direct human injury.

At this point in the sequence, there is no energy present which would cause structure 20' to remain deformed. Since the deformation of inner layer 22 and outer layer 24 has occurred elastically, inner layer 22 and outer layer 24 will rebound back toward their original shapes in structure 20.

The extent to which inner layer 22 and outer layer 24 return to their original shapes will depend upon the degree of their damage created by the explosive blast. If no permanent damage is created to inner layer 22 and outer layer 24, structure 20' will return to virtually its original form as structure 20 shown in FIG. 2, with the difference being that, since intermediate layer 10 will no longer be intact, there will be a minimal connection of outer layer 24 to inner layer 22. If permanent damage occurs in inner layer 22 and outer layer 24, there will be only a partial return of structure 20' to its original form as structure 20; this means that structure 20' will return to a form which is slightly oversized vis-a-vis' the original dimensions of structure 20.

For many embodiments of the present invention, referring again to FIG. 2, undeformed structure 20 preferably admits of incorporation at open side 12 of a replaceable structural side, not shown but locationally indicated at open side 12 as what may be envisioned to be lid 12, which may be removable from structure 20 or moveably engaged, door-like (e.g., slidably, rotatably or hingedly), with respect to structure 20. Some embodiments implementing a lid 12 preferably implement closure sealing means (e.g., a rubber seal or rubber gasket) which, when lid 12 is in the "closed" position with respect to structure 20, upon explosion from within structure 20 is gradually compromised as structure 20 deforms into structure 20', thus allowing for depressurization to occur slowly.

For some embodiments which manifest isotropism such as shown in FIG. 2 and which implement a lid 12, lid 12 is preferably similar to any of the fixed structural sides of structure 20, lid 12 analogously comprising inner and outer sublayers having fiber-reinforced matrix material, and an intermediate sublayer having higher density foam at a face subregion and lower density foam at an edge subregion; also, it may be preferable for such embodiments that edge subregions 16c and 16d, each shown abutting three junctional edges in FIG. 1, each be extended to abut the fourth junctional edge with respect to lid 12 in the closed position at open side 12.

The structural configuration in accordance with the present invention, because of the reduced loading associated therewith, has significantly greater explosion survival probability than ballistic containment devices made of conventional materials. Since the material composition of the structure according to this invention has flexibility, the structure according to this invention will react high rate loadings over a large time frame.

To elaborate, a force F experienced by a material of mass m is given as $$F = m\frac{dv}{dt}$$

or $$F = \frac{dp}{dt}$$

where dv/dt is the rate of change of velocity and dp/dt is the rate of change of mentum. As the material is loaded, it reacts the applied load. The stiffer the material, the faster it will react the load. Accordingly, conventional materials, such as metals or conventional composites, will experience very high resultant forces. By contrast, the composite having fiber-reinforced high strain-to-failure viscoelastic matrix material in combination with foam material, in accordance with the present invention, is less stiff and hence will experience significantly reduced resultant forces.

Tests conducted by the U.S. Navy on fiber-reinforced urethane material demonstrate the tremendous flexibility that is achievable by composite material forms in accordance with the present invention. Moreover, the deformations of the fiber-reinforced urethane material which were produced in these tests were shown to be completely or virtually completely recoverable.

In the example discussed hereinabove with reference to the figures, the structure in accordance with the present invention has a tri-stratified configuration through the thickness of its sides wherein the inner skin and outer skin each include fiber-reinforced high strain-to-failure viscoelastic matrix material and the intermediate core layer includes foam material. Although this tri-stratified configuration is fairly representative with respect to the present invention and is preferably utilized for many embodiments of the present invention, there are alternative embodiments of the present invention which preferably utilize a tri-stratified configuration which differs therefrom in terms of its material constituents.

For example, still with reference to FIG. 2, alternative embodiments of the present invention have a tri-stratified configuration wherein outer layer 24 includes fiber-reinforced conventional matrix material (e.g., glass fiber-reinforced epoxy or graphite fiber-reinforced epoxy), intermediate layer 10 includes foam material, and inner layer 22 includes fiber-reinforced high strain-to-failure viscoelastic matrix material (e.g., glass fiber-reinforced urethane or graphite fiber-reinforced urethane). The fiber-reinforced matrix system of this composite structure is a "hybrid" of two different fiber-reinforced homogeneous matrix systems. The fiber-reinforced conventional matrix material of outer layer 24 supplies additional rigidity to structure 20 and, upon explosion from within structure 20, may serve to enhance energy absorption by allowing more crushing of intermediate layer 10 prior to any motion of outer layer 24.

Other embodiments of this invention provide a structure which includes fiber-reinforced heterogeneous matrix material. For example, still referring to FIG. 2, the fabric material for inner layer 22 and outer layer 24 of structure 20 is selectively ("preferentially") infiltrated in some locations with conventional matrix material (such as epoxy) and in other locations with highly viscoelastic matrix material (such as polyurethane). The locations of highly viscuelastic matrix infiltration generally correspond to edge region 16 of foam box 10 and the locations of conventionel matrix infiltration generally correspond to face region 14 of foam box 10. This configuration utilizes selective infiltration so as to enhance flexibility of structure 20 where it coincides with edge region 16 and to enhance rigidness of structure 20 where it coincides with face region 14. The enhanced flexibility coincident with edge region 16 provides greater connective support from which the rigal areas coincident with face region 14 may deform. The fiber-reinforced matrix system of this composite structure is a single fiber-reinforced heterogeneous matrix system. The fiber-reinforced matrix system is "heterogeneous" in that it includes a "hybrid" of at least one form of fiber-reinforced highly viscoelastic matrix material and at least one form of fiber-reinforced conventional matrix material.

Various "hybrid" embodiments of composite structures in accordance with the present invention are distinguishible from the conventional notion in the art of "hybrid" composite structures. Hybridity of composite structures is conventionally thought to entail one matrix material and two or more fiber materials. The "unconventional" hybridity according to many embodiments of the present invention entails one or more fiber materials and two or more matrix materials. In accordance with the present invention are multifarious hybrid embodiments which vary in their respective manifestations of fiber-reinforced highly viscoelastic matrix material and fiber-reinforced conventional matrix material.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Method for making a rectilinear box-like composite structure, comprising:

providing a five-sided rectilinear box-like core structure comprising foam material, said core structure generally having lower density along its junctional edges;

providing an inner skin for said core structure, said inner skin comprising fiber-reinforced highly viscoelastic matrix material; and providing an outer skin for said core structure, said outer skin comprising fiber-reinforced highly viscoelastic matrix material;

at least some said fiber-reinforced matrix material in at least one said skin being fiber-reinforced high strain-to-failure viscoelastic matrix material.

2. Method for making a composite structure as in claim 1, wherein said providing said core structure includes assembling a plurality of members, each said member comprising foam material, so as to form said core structure.

3. Method for making a composite structure as in claim 2, wherein said plurality of members comprises five substantially rectangular planar face members and eight substantially "L"-shaped linear edge members, said face members being made of higher density foam material and said edge members being made of lower density foam material.

4. Method for making a composite structure as in claim 3, wherein said providing an inner skin includes:

providing a rectilinear box-like shape which is smaller than and similar to said core structure;

covering said shape with fabric in three orientations;

positioning a mold over said shape;

infusing said fabric material with matrix material;

removing said mold;

positioning said shape within said core structure; and applying heat to cure said matrix material.

5. Method for making a composite structure as in claim 3, wherein said providing an outer skin includes:

covering said core structure with fabric material in three orientations;

positioning a mold over said core structure;

infusing said fabric material with matrix material;

applying heat to cure said matrix material; and removing said mold.

6. Method for making a composite structure as in claim 5, wherein said providing an inner skin includes:

providing a rectilinear box-like shape which is smaller than and similar to said core structure;

covering said shape with fabric in three orientations;

positioning a mold over said shape;

infusing said fabric material with matrix material;

removing said mold;

positioning said shape within said core structure; and applying heat to cure said matrix material.

7. Method for making a composite structure as in claim 1, wherein said providing an outer skin includes:

covering said core structure with fabric material in three orientations;

positioning a mold over said core structure;

infusing said fabric material with matrix material;

applying heat to cure said matrix material; and removing said mold.

8. Method for making a composite structure as in claim 1, wherein said providing an inner skin includes:

providing a rectilinear box-like shape which is smaller than and similar to said core structure;

covering said shape with fabric in three orientations;

positioning a mold over said shape;

infusing said fabric material with matrix material;

removing said mold;

positioning said shape within said core structure; and applying heat to cure said matrix material.

9. Method for making a composite structure as in claim 1, wherein at least some said high strain-to-failure viscoelastic matrix material is a material selected from the group consisting of polyurethane and polyurethane/urea.

* * * * *